United States Patent [19]
Curtiss, Jr.

[11] 3,900,061
[45] Aug. 19, 1975

[54] METHOD OF FABRICATING LARGE TIRES

[75] Inventor: Walter W. Curtiss, Jr., Brimfield, Ohio

[73] Assignee: The Goodyear Tire & Rubber Company, Akron, Ohio

[22] Filed: Jan. 12, 1973

[21] Appl. No.: 323,166

[52] U.S. Cl. .............................. 152/352; 156/128 R
[51] Int. Cl.² ........................................... B60C 5/00
[58] Field of Search ........... 152/352, 353, 359, 356; 156/128, 133

[56] References Cited
UNITED STATES PATENTS

| | | | |
|---|---|---|---|
| 1,201,282 | 10/1916 | Fisher | 152/352 |
| 1,802,088 | 4/1931 | Midgley | 152/353 |
| 2,388,421 | 11/1945 | Kraft et al. | 152/352 |
| 3,622,414 | 11/1971 | Heimovics, Jr. et al. | 156/128 R |
| 3,693,690 | 9/1972 | Mills | 152/352 |

*Primary Examiner*—Robert J. Spar
*Assistant Examiner*—Kenneth Noland
*Attorney, Agent, or Firm*—F. W. Brunner; M. L. Gill

[57] ABSTRACT

A very large off-the-road type tire having a plurality of bead cores and a plurality of bias laid carcass plies, which when in the configuration in which it was cured has a section height which is substantially less than the section height of the tire when inflated and an axial bead spacing which is substantially greater than the axial bead spacing when the tire is mounted on a rim and inflated.

The foregoing abstract is not to be taken as limiting the invention of this application, and in order to understand the full nature and extent of the technical disclosure of this application, reference must be made to the accompanying drawing and the following detailed description.

10 Claims, 1 Drawing Figure

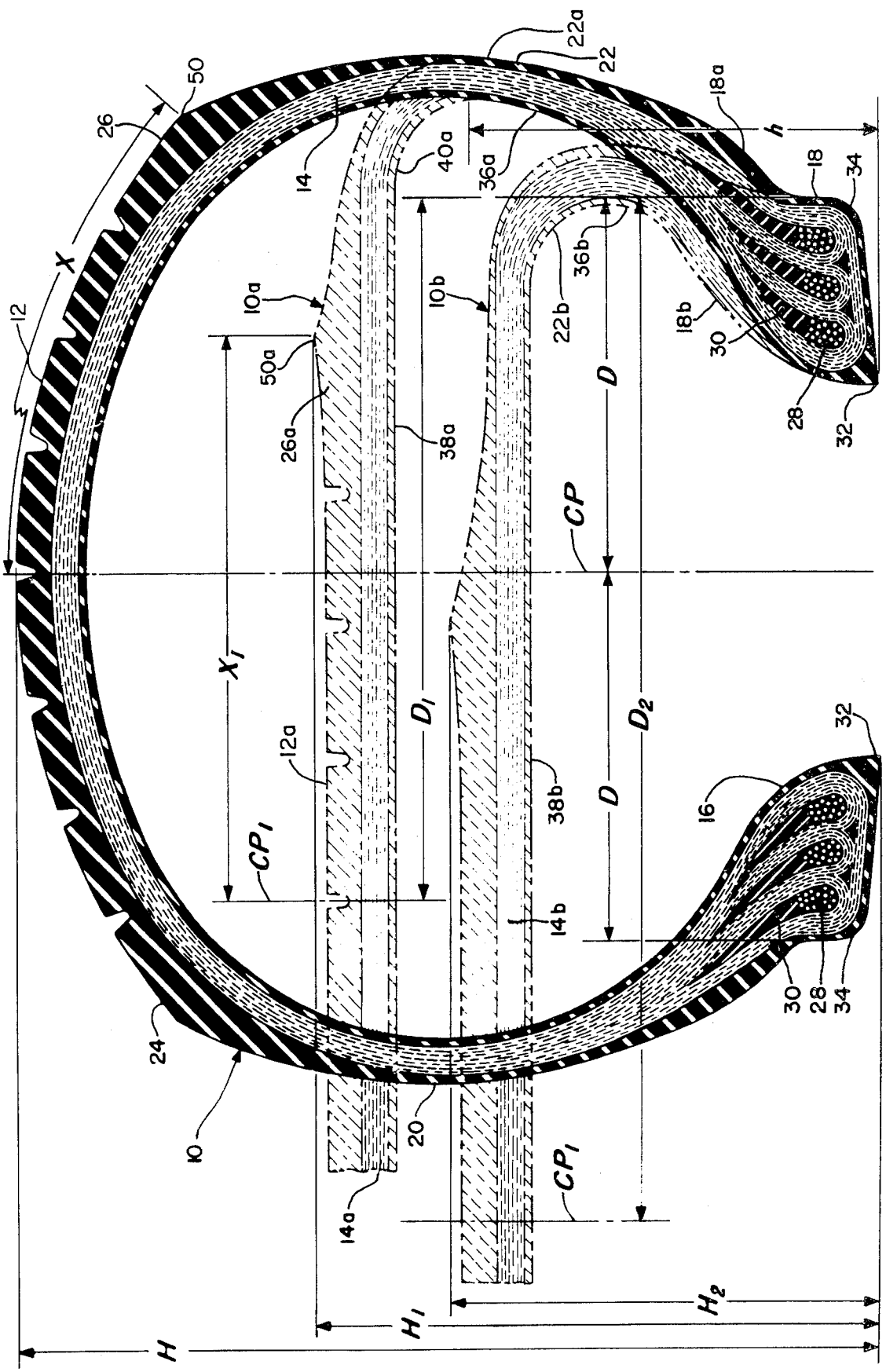

METHOD OF FABRICATING LARGE TIRES

This invention relates to pneumatic tires and more particularly to very large off-the-road type tires.

In large construction and excavation projects, such as highways, dams and mining, etc., there is often a desire for very large earthmoving equipment having increased capacity. The increase in size and capacity of such equipment almost necessarily requires an increase in the size of the tire and as the size of the tire becomes greater the cost also increases. One significant factor in the increase in cost of such tires is the equipment required for curing. If the space provided for receiving a mold in the curing press is smaller than the mold required to cure the tire, a larger press is required. It will be readily appreciated that if special even larger curing presses are required in addition to the very large diameter, expensive molds the cost of manufacturing such large tires is increased inordinately.

It is, therefore, an object of this invention to provide extra large pneumatic tires without an inordinate increase in cost. It is a further object of the present invention to provide a very large off-the-road type tire and the method of making the same at a reduced cost and yet maintain the structural strength, durability aand stability of the tire.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawing the single FIGURE illustrates the cross-sectional contour of a tire constructed in accordance with this invention in the as-built, as-cured and as-inflated configurations superposed on top of each other.

With reference to the drawing, the tire $10$, $10a$, $10b$ is shown in cross-section and illustrating the cross-sectional contour it has when it is mounted on a rim and inflated, during curing and as constructed on a tire building drum, respectively. For purposes of clarity and in order to provide as large an illustration as possible, only one half of the tire in the as-built and as-cured configuration is illustrated. The half of the tire not shown is the same as the half shown and a description of the tire half shown will be considered to be that of the half not shown also. Corresponding parts will be designated by the same numeral in all three stages of manufacture. However, when referring to the tire in the inflated configuration there will be no postscript following the reference. When referring to the tire when in the configuration in which it is cured the postscript "$a$" will appear after the reference numeral. When referring to the tire as in the configuration in which it is built on a tire building drum the postscript "$b$" will appear after the reference numeral. Similarly, reference letters relating to inflated dimensions, cured dimensions and as-built dimensions will have no subscript, the subscript 1, and the subscript 2, respectively.

A tire 10 of the type with which the present invention is concerned is a large off-the-road type tire having an outside diameter greater than 200 inches and suitably constructed and reinforced to carry the extremely high loads and deflections encountered when used in conjunction with heavy duty off-the-road construction equipment. The tire 10 includes a tread portion 12 extending circumferentially thereabout and is reinforced with a carcass structure 14 extending circumferentially about the tire and from the bead portion 16 to the bead portion 18. In the particular embodiment illustrated the carcass 14 includes 12 plies of tire cord fabric extending at alternating bias angles of approximately 35° with respect to the mid-circumferential centerline of the tire. In such large tires of a bias ply construction, however, the cord angle may vary from 30° to 50°. The strong and rigid bead portions 16 and 18 merge with flexible sidewall portions 20 and 22, respectively, which in turn terminate at their radially outer extremities in the lateral portions 24 and 26 of the tread portion 12.

The carcass plies are divided into three groups of four plies each with the radially inner ends of each group wrapped around its respective inextensible bead core 28. Thus in the particular embodiment illustrated there are six inextensible bead cores 28 with three being located in each bead portion 16 and 18. An apex strip 30 of rubber extends generally radially outwardly of each bead core 20 providing a smooth merger between the radially inner ends of the carcass plies as they are wrapped about the respective bead core 28.

Each bead portion terminates at its axially inward, radially inward end in a toe 32 and terminates at its axially outer, radially inner end in a heel 34. For purposes of this invention the section height $H$, $H_1$, $H_2$ of the tire shall be construed to mean the radial distance between a line parallel to the rotational axis of the tire and tangent to the toe 32 of the tire and the radially outer extremity of the tire. If the bead portions 16 and 18 of the tire are of different hoop diameters, the section height $H$, $H_1$, $H_2$ will be measured with respect to the bead portion 16 or 18 having the smallest hoop diameter with respect to the rotational axis of the tire. Also for purposes of this invention the axial spacing between the bead portions of the tire shall be construed to mean the axial distance $2D$ between the axially outer sides of the two heels 34 of the bead portions 16 and 18.

In accordance with the present invention, the tire $10b$ is originally built on a generally cylindrical tire building drum (not shown) in the general cylindrical configuration illustrated. It should be noted that the tire $10b$ is constructed on a high "crown drum," that is, the outside diameter of the generally cylindrical portion of the drum or inner diameter of the tire $10b$ is substantially larger than the diameter of the bead portion $18b$. The bead portion $18b$, when in the configuration in which it was built on the cylindrical drum, does not have precisely the same contour as in the inflated tire 10. The tire $10b$ has a generally radially extending inner portion $36b$ of the sidewall $22b$ which smoothly merges into a cylindrical surface of the tire building drum. The tire $10b$ in the as-built configuration has a predetermined section height $H_2$ and a predetermined axial spacing $2D_2$ between the heels of the beads. A series of plies of tire cord fabric are wrapped about the drum and their ends turned about the bead cores 28 to form the carcass $14b$. The cords in the carcass plies are substantially inextensible when assembled on the drum inasmuch as their modulus of elasticity is at least 20 grams per denier as determined by ASTM specification part 24, number D 885, section 11.10 (1969 edition). The cords in the plies may include, by way of example only, nylon, wire, polyester, rayon, fiberglass, or Fiber B.

The tire 10b is then removed from the tire building drum and shaped in a tire curing mold (not shown). The tire 10a, when in the configuration in which it is cured, or in other words when in the tire curing mold, has its axial spacing between the beads decreased and the section height increased from the as-built dimensions. It should be noted that in the embodiment illustrated the radially inner 45 percent of the inflated tire section height H, or radial extent h of the tire cross-section, when in the tire curing mold has the same shape or configuration as the corresponding portion of the inflated unloaded tire 10. It is preferred that at least the radially inner 30 percent of the inflated tire section height be maintained in the curing mold in the configuration in which the corresponding portion of the tire assumes when inflated. In any event, it is recommended that the portion of the tire including the apex strips 30 be maintained in the mold in the configuration in which they assume when the tire 10 is inflated.

The radially inner portion 3a of the sidewall 22a including the bead portion 18a extends generally in a radial direction and smoothly merges with a cylindrical portion 38a which includes the tread portion 12a and the radially outer portion 40a of the sidewall 22a.

When the tire 10a is completely cured it is removed from the mold and allowed to cool in a normal manner. The axial spacing between the bead portions 18 and 20 is then reduced and the tire inflated to its toroidal form. It should be noted that, by maintaining the lower portions of the tire in the same configuration in the mold as that of the inflated tire, there is no bending or distortion of the lower portion of the sidewalls upon inflation to cause extra internal stresses in this area.

Since the tire was made with substantially inextensible cords in the carcass the cords will not increase in length upon inflation more than 5 percent of their length when the tire is being cured.

In order to provide maximum economy in the manufacture of the tire 10 and yet maintain the structural integrity and durability of the tire 10, it is preferred that the axial spacing $2D_1$ between the heels 34 of the bead portions when the tire 10a is being cured be equal to from 1.5 to 3 times as large as the axial spacing 2D between the heels 34 of the bead portions 16 and 18 of the tire 10 when mounted on a rim and inflated. Further, the axial bead spacing $2D_1$ of the tire 10a in the mold should be between 0.5 and 0.9 times as large as the axial bead spacing $2D_2$ of the tire 10b when being built on the tire building drum.

The section height $H_1$ of the tire 10a, when in the configuration in which it was cured, should be equal to between 50 and 80 percent of the section height H of the tire 10 when mounted on a rim and inflated. The section height $H_1$ of the tire, when being cured, should be between 1.1 and 1.7 times as great as the section height $H_2$ of the tire when being built on the tire building drum.

Further, the cross-sectional contour length of the tire decreases progressively from the as-built tire 10b to the as-cured tire 10a and ultimately has the lowest contour length in the mounted and inflated tire 10. For purposes of this invention, the cross-sectional contour length is a distance along the inner surface of the tire as viewed in cross-section from one bead toe 32 to the mid-circumferential centerplane CP and finally to the opposite bead toe 32. A bias ply tire constructed and cured within the ranges set forth above will decrease in cross-sectional contour length at least 2 percent from the cured to inflated configuration. Further, it will be noted that the distance $X_1$ between the centerplane and a point 50A in the shoulder portion 26A of the as-vulcanized tire 10A is substantially greater than the distance X between the centerplane and the corresponding point 50 in the shoulder portion 26 of the cured tire 10.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread portion, a pair of sidewall portions, a pair of bead portions, a carcass extending from bead portion to bead portion and an inflated unloaded outside diameter greater than 200 inches, said tire when in the configuration in which it was cured being characterized by: a pair of radially inner portions extending generally radially outwardly from said bead portions and having an outside cross-sectional contour which is substantially the same as the cross-sectional contour of the radially inner 30 percent of the tire when mounted on a rim and inflated; said radially inner portions smoothly merging with the lateral edges of a cylindrical portion comprising said tread portion flanked on axially opposite sides by a substantial portion of the radially outer portions of said sidewall portions; and, said bead portions being spaced apart axially a distance equal to between 1.5 and 3 times the axial spacing between said bead portions when said tire is mounted on a rim and inflated.

2. A tire as claimed in claim 1, in which each bead portion includes a plurality of bead cores.

3. A tire as claimed in claim 1, wherein said carcass includes at least 10 plies of tire cord fabric.

4. A tire as claimed in claim 2, wherein said carcass includes at least 10 plies of tire cord fabric.

5. A tire as claimed in claim 4, wherein the cords in said plies are disposed at an acute angle of between 30° and 50° with respect to the mid-circumferential centerline of the tire when inflated and unloaded.

6. A pneumatic tire having a tread portion, a pair of sidewall portions, a pair of bead portions, a carcass extending from bead portion to bead portion, and an outside inflated unloaded diameter greater than 200 inches, said tire when in the configuration in which it is in, when it is in the curing mold, having a section height which is equal to between 50 and 80 percent of the inflated unloaded section height and having a cross-sectional contour length between the beads which is at least 2 percent greater than the cross-sectional contour length of the tire when inflated and unloaded.

7. A tire as claimed in claim 6 in which said bead portions, when said tire is in configuration in which it was cured, are spaced apart axially a distance equal to between 1.5 and 3 times the axial spacing between said bead portions when said tire is mounted on a rim and inflated.

8. A tire as claimed in claim 6 in which the cross-sectional contour of the radially inner 30 percent of the tire in the configuration in which it was cured is substantially the same as in the inflated and unloaded configuration.

9. A tire as claimed in claim 7 in which the cross-sectional contour of the radially inner 30 percent of the tire in the configuration in which it was cured is substantially the same as in the inflated and unloaded configuration.

10. A tire as claimed in claim 9 wherein the cords in said plies are substantially inextensible and when the tire is inflated to design inflation pressure are disposed at an acute angle with respect to the mid-circumferential centerline of the tie between 30° and 50°.

* * * * *